United States Patent [19]

Paganelli

[11] Patent Number: 4,906,052

[45] Date of Patent: Mar. 6, 1990

[54] TIRE CRAMPON

[76] Inventor: Franco Paganelli, Via Cà di Giulietta 275, 40036 Monzuno (Providence of Bologna), Italy

[21] Appl. No.: 261,549

[22] Filed: Oct. 24, 1988

[30] Foreign Application Priority Data

Apr. 13, 1988 [IT] Italy .................................. 4789/88[U]

[51] Int. Cl.$^4$ ............................................. B60B 15/26
[52] U.S. Cl. ..................................... 301/40 R; 301/51; 305/5
[58] Field of Search ................. 301/38 R, 40 R, 40 S, 301/41 R, 44 T, 47, 51; 305/4, 5, 1

[56] References Cited

U.S. PATENT DOCUMENTS

| | | | |
|---|---|---|---|
| 1,367,661 | 2/1921 | Ingram | 305/5 X |
| 1,777,964 | 10/1930 | Dunster | 301/51 |
| 2,282,470 | 5/1942 | Gilbert | 301/40 S |

FOREIGN PATENT DOCUMENTS 0128802 6/1987 Japan .................................. 301/40 S Primary Examiner—Russell D. Stormer
Attorney, Agent, or Firm—Guido Modiano; Albert Josif

[57] ABSTRACT

The tire crampon comprises a cross-shaped member having four arms, interconnected by half-braces bearing bushes for connection to a vehicle's wheel hub bolts. Counter-arms are slideable on the arms and each have a toothed sector rigidly associated with an end thereof. The counter-arms move radially outwardly away from the cross-shaped member upon having a centrifugal force applied thereto, and due to the biasing action of compression springs acting between the arms and the counter-arms, thereby causing the toothed sectors to grip the ground. Chains limit the excursion of the counter arms, which can also be locked in a retracted position by pawl devices.

3 Claims, 1 Drawing Sheet

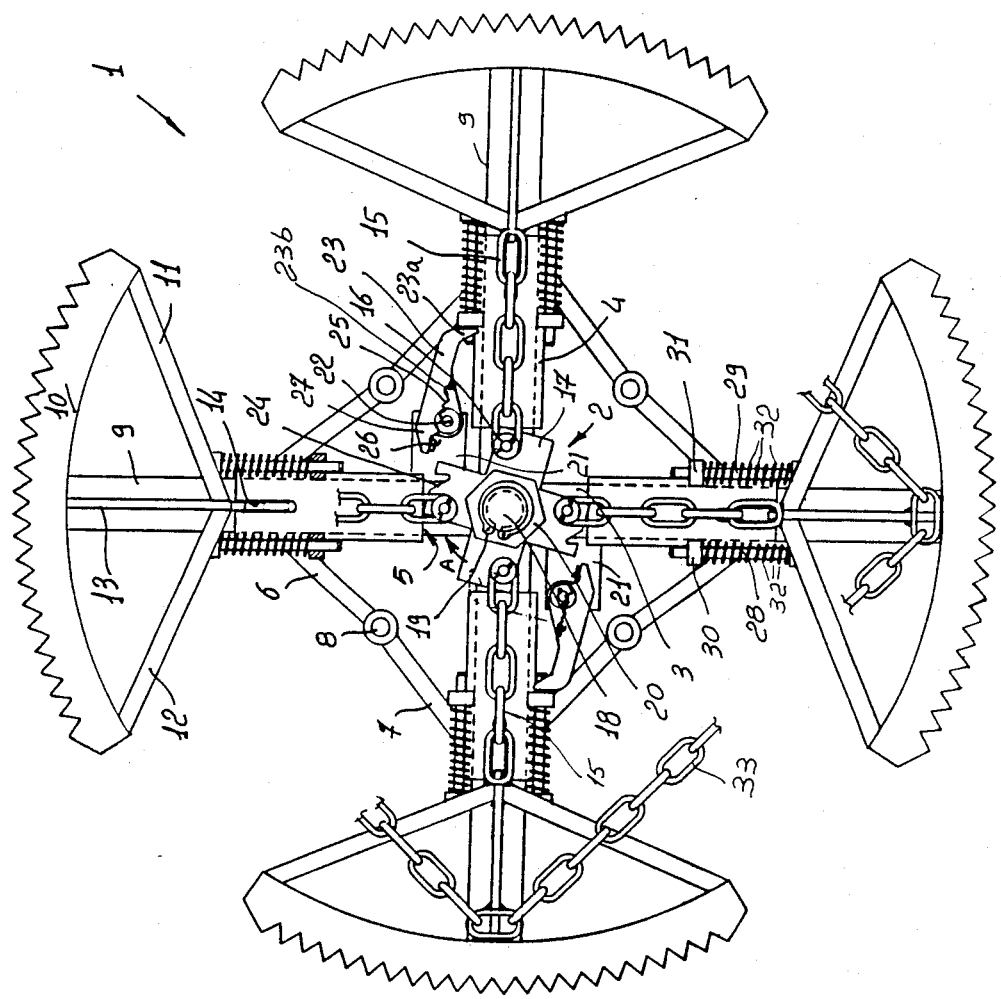

TIRE CRAMPON

BACKGROUND OF THE INVENTION

The present invention relates to a tire crampon.

Tire crampons are known which are mounted on the tread to increase its adherence in particular conditions of use: in operating condition, the entire weight of the vehicle bears on said devices, i.e. they are squeezed between the tire and the ground, and this entails the rapid wear both of the crampon and of the tire. Besides this, the parts of known crampons which make contact with the ground are reduced with respect to the extension of the tire and cause, as the vehicle moves, shaking and jerking which abnormally stress the suspension.

SUMMARY OF THE INVENTION

The technical aim of the present invention is to eliminate the above described disadvantages, i.e. to provide a tire crampon which is not squeezed between the tire and the ground and therefore does not lead to the early wear of the tire and causes no jerking of the vehicle.

Within the scope of this technical aim, an object of the present invention is to achieve the above aim with a simple structure, which is relatively easy to utilize, safe and effective in use, and which has a relatively low cost.

This aim and object, as well as other objects which will become apparent hereinafter, are achieved by at least one tire crampon according to the present invention, characterized in that it comprises a substantially star-shaped member having at least four arms, and means for fixing said star-shaped member to wheel hub bolts, said arms being arrangeable radially with respect to a wheel and having, slideably mounted thereon, respective counter-arms, said counter-arms each having at least one end and at least one toothed sector, rigidly associated with said end, said tire crampon further comprising means for locking sliding movement of said counter-arms and said toothed sectors in a retracted idle position, said tire crampon defining an active position which extends beyond a tire perimeter upon having a centrifugal force applied thereto.

BRIEF DESCRIPTION OF THE DRAWINGS

Further peculiarities will become apparent from the detailed description of a preferred but not exclusive embodiment of a tire crampon according to the invention, illustrated only by way of non-limitative example in the accompanying drawings, wherein:

FIG. 1 is a partially sectional front view of a tire crampon according to the invention.

DESCRIPTION OF THE PREFERRED EMBODIMENTS

With reference to the above described figure, the tire crampon according to the invention is generally indicated by the reference numeral 1. The crampon 1 comprises a substantially star-shaped member 2 having a least four flattened arms 3 (distributed, in the case of four arms, at 90 degrees to one another): profiled elements 4 with a U-shaped cross section are welded onto the arms 3 which define, in said profiled elements, respective tubular guides 5 having a flattened rectangular cross section.

Mutually inclined connecting half-braces 6,7 are welded to the sides of the profiled elements 4 and bear, at their ends, bushes or washers 8 arranged on different planes from those of the arms 3: the bushes 8 are intended to be centered on the wheel hub bolts of vehicle: advantageously the ends of the arms 3 protrude from the profiled elements 4 to constitute teeth-like elements for centering on the thickness of the tire rim.

Respective counter-arms 9 are mounted longitudinally slideable along the guides 5 of the arms, and respective toothed sectors 10 are welded to said counter-arms; the sectors 10 are reinforced by spokes 11, 12, 13 of which the central spoke 13 slides along a longitudinal slot 14 of the profiled element 4 while the ends of the spokes 11 and 12 are welded to the spoke 13.

The end link of a chain 15 which has its other end hooked to a respective stop element 16 of a cross-shaped element 17 is welded at the convergence point of the spokes 11, 12, 13; the cross 17 is mounted at the center of the star 2 and is rotatable about the central pivot 18, the elastic ring 19, and the nut 20.

Two brackets 21 are fixed in diametrally opposite positions to the arms 3, and two pawls 23 are rotatably mounted on pivots 22 and have at one end a point 23a adapted to engage in a notch 24 provided on the cross-shaped element 17.

Traction springs 25 are mounted on the pawls 23 and are arranged so as to engage a stop element 26, for locking the rear part 27 of the pawl, with a hooking element 23b of said pawl.

The point or tip 23a of the pawl 23, under the action of the spring 25, tends, depending on its initial arrangement (i.e. depending on whether the spring is on one side or on the other side of the pivot 22), to press towards the notch 24 or to remain spaced therefrom with the stop element 26 resting against the rear part 27.

Two stems 28 and 29 are welded to the spokes 11 and 12, substantially parallel to the spoke 13, and pass through respective perforated blocks 30, 31 welded to the respective guide 5: respective compression springs 32 are mounted on the stems, between the blocks and the arms, and bias the sectors 10 outwardly.

The convergence regions of the spokes 11, 12, 13 have chain links welded thereto which are intended to be mutually connected by four chain portions 33 which act as safety stop elements and are advantageously arranged substantially like the side of a square; obviously the chains may be replaced with a cable or other suitable safety stop element.

When the crampon is not in use, the pawls have their points 23a engaged against the notches 24 and the cross-shaped element 17 is rotated, as indicated by the arrow A, so that the toothed sectors assume a retracted position.

When the pawls 23 are released, the cross-shaped element is also released, and the sectors 10 can move radially away from the center of the star 2 under the action of the centrifugal force and the springs 32, and the teeth of the toothed sectors 10 are thus pressed against the ground.

The pawls and the notches constitute the means for locking the centrifugal sliding of the counter-arms.

The operation of the tire crampon according to the invention is as follows: the crampon is fixed to the driving wheels of a vehicle by means of the wheel bolts, which are caused to pass through the washers 8: in the absence of snow and ice the counter-arms are retracted in an idle configuration with the teeth 23a in the notches 24.

When there is snow or ice the counter-arms are moved to their active configuration, protruding from the arms, and the teeth arrange themselves spaced from the notches.

In this configuration the sectors 10 can protrude slightly from the tire and press against the ground when a centrifugal force is applied thereto and due to biasing action of the springs 32, and can retract against the biasing action of the springs 32 when they rest on the ground.

It should be noted that with the crampon according to the invention mounted on the tire, the ground resting cross section increases and the road grip in difficult conditions therefore increases.

The extreme speed with which it is possible to pass from the idle position to the active position of the crampon should be noted: it is therefore possible to keep the crampons in a retracted configuration if there is no snow or if there is scarce snow and to make them protrude from the arms when required.

It has thus been observed that the invention achieves the intended aim and object.

The invention thus conceived is susceptible to numerous modifications and variations, all of which are within the scope of the inventive concept.

Furthermore all the details may be replaced with other technically equivalent elements.

In practice, the materials employed, as well as the shapes and dimensions, may be any according to the requirements without thereby abandoning the scope of the protection of the following claims.

I claim:

1. Tire crampon, comprising at least one substantially star-shaped member; at least four arms projecting from said member to confer said star shape; means for fixing said star-shaped member to wheel hub bolts, said arms being distributed radially with respect to a wheel (at 90 degrees between one another); slidable counter-arms mounted on said arms respectively, for a sliding movement thereon; said counter-arms each having at least one end; at least one toothed sector rigidly secured to said end; means for locking said counter-arms and said toothed sectors in a retracted idle position when effecting said sliding movement, said counter-arms being so mounted on said arms as to be able to effect said sliding movement toward an active position which extends beyond a tire perimeter, upon having a centrifugal force applied thereto, wherein said means for locking said counter-arms during their sliding movement comprise chain means hooked, at one end, to a related one of said sectors and, at the other end, to one of said arms of said cross-shaped member; means for rotatably mounting said cross-shaped member being at the center of said star-shaped member; at least one notch on said cross-shaped member; an oscillating pawl, the tip whereof is engageable in said notch; a spring for urging said pawl in engagement with said notch in a first locking position, and in a further locking position to lock said chain means in a tensioned condition.

2. Tire crampon according to claim 1, wherein at least one helical compressing spring is mounted between each arm and counter-arm, which spring in conjunction with the effect of the centrifugal force keeps said toothed sectors pressed outwards.

3. Crampon according to claim 1, wherein said counter-arms have respective chain links welded thereto, said chain links being mutually connectable by portions of safety chains.

* * * * *